United States Patent [19]

Bengtson et al.

[11] Patent Number: 5,101,961
[45] Date of Patent: Apr. 7, 1992

[54] FEEDING SCREW

[75] Inventors: K. Eric Bengtson; E. LeRoy Baldwin, both of San Luis Obispo, Calif.

[73] Assignee: Jenike & Johanson, Inc., Westford, Mass.

[21] Appl. No.: 745,738

[22] Filed: Aug. 16, 1991

[51] Int. Cl.$^5$ .............................................. B65G 21/00
[52] U.S. Cl. ................................. 198/550.1; 198/661
[58] Field of Search .................... 198/661, 662, 550.1; 222/412, 413

[56] References Cited

U.S. PATENT DOCUMENTS

| | | | |
|---|---|---|---|
| 958,965 | 5/1910 | May | 198/661 X |
| 4,015,734 | 4/1977 | Laidig | 198/661 X |
| 4,386,695 | 6/1983 | Olson | 198/661 |
| 5,052,874 | 10/1991 | Johanson | 198/661 X |

FOREIGN PATENT DOCUMENTS 0511782 1/1921 France ............................. 222/412

Primary Examiner—Joseph E. Valenza
Assistant Examiner—Cheryl L. Gastineau
Attorney, Agent, or Firm—Lahive & Cockfield

[57] ABSTRACT

A feed screw for use in a rectangular bin outlet permits uniform feed from the bin along a length of the screw. This is achieved with a screw of uniform pitch on a shaft comprising a plurality of coaxial and contiguous cylindrical sections having progressively decreasing diameters dimensioned so that the differences in volume capacity between each pair of contiguous sections are equal over such length.

6 Claims, 2 Drawing Sheets

FEEDING SCREW

SUMMARY OF THE INVENTION

This invention relates generally to feeding screws for bins and hoppers containing particulate solids, also referred to as bulk solids. More particularly, the invention relates to feeding screws for bins and hoppers capable of mass flow, that is, material flow over the entire length of the outlet axially of the screw.

Various forms of feeders are used, including screw feeders, belt feeders, apron feeders, vibratory feeders, table feeders, star feeders and rotary plows. Screw feeders have the advantage that they can be completely enclosed for dust control. However, where the hopper outlet has significant length in the axial direction of the screw, the inherent action of the screw may cause nonuniform feeding from the bin. This is readily understood in the case of a hopper having an outlet of rectangular horizontal cross section discharging on to a feed screw of uniform pitch and diameter on a horizontal shaft of uniform diameter. At the back end of the screw, that is, the end furthest from the discharge end, each revolution of the screw advances a given volume of material, thereby creating a space of equal volume that is filled from the section of the hopper immediately above it. In subsequent revolutions the material is progressively advanced and continues to fill a space of the same dimensions between the screw flights, whereby no space is provided for receiving additional material from adjacent sections of the hopper. The result is that material flow from the hopper is concentrated above the back end of the screw.

Therefore, it has long been recognized that for rectangular hopper outlets employing screw feeders, the screw must have an increasing material capacity from the back toward the discharge end. This increase can be produced by providing flights of increasing pitch, or a pipe or shaft of decreasing diameter, or a screw of increasing flight diameter, or some combination of these structures. In practice, it is commonly desirable to employ a feed screw of constant flight diameter, and the practical options are variable pitch screws and/or variable diameter pipes or shafts.

Both of the last mentioned techniques have presented significant difficulties of fabrication and limitations in design. One conventional method of fabrication consists in first providing screw flights of uniform pitch and diameter welded to a shaft of uniform diameter, and then wrapping a strip of metal around and between the flights in the form of a cone. This forms a tapered shaft section, but difficulty is encountered in fitting the tapered shaft to the flights because the flights are not always perfectly straight relative to the shaft, nor is the pitch constant.

Alternatively, a frustoconical piece may be attached to a shaft of constant diameter, and flights of constant diameter and pitch may be cut at their inner extremities to conform to the conical piece. The initial formation of the flights usually involves bending them into shape, and therefore internal stresses will have been created prior to such cutting. The cutting away of some of each flight invariably causes it to "spring" to a new shape, again making it difficult to fit the screw to the conical piece at the inner contacting edges within a reasonable fabrication tolerance. Either of the above fabrication techniques requires considerable skill and experience.

Aside from problems of fabrication, a feed screw of constant diameter and pitch on a frustoconical shaft inherently produces nonuniform feeding from the hopper per unit of length along the shaft axis. Considering the shaft axis to be divided into small increments of equal axial length, ideally the difference between the volumes of each increment and the next adjacent increment should be the same throughout the length of the screw. However, although the difference between the diameters of each increment and the next adjacent increment is a constant, the difference between adjacent volumes is a linear function of the diameter and is therefore greatest at the back of the screw.

It has been generally recognized that fabrication tolerances limit the length of screw feeders, whether of the variable pitch type or the variable shaft diameter type. To understand this, consider a constant pitch screw. If the pitch dimension varies as a result of the specified fabrication tolerances, the capacity of the screw from one pitch to the next will be greater or smaller than the nominal capacity. For a variable pitch feeder the smallest practical pitch is one half a screw flight diameter, the largest is one screw flight diameter, and the maximum screw length is approximately three screw flight diameters. In order to make a longer screw, the increase in screw capacity from one pitch to the next soon becomes less than the decrease in capacity that may result from the specified tolerance of fabrication. This makes it difficult to ensure that the capacity of the screw will actually increase uniformly in the direction of feed.

For a screw of constant pitch on a changing shaft diameter the practical length limit is also three flight diameters. The practical length of the tapered section is determined by the change in volume at the small end of the taper, and in the limit, the change in volume from one pitch to the next due to the change in shaft diameter will equal the change in volume from one pitch to the next due to the maximum deviation in pitch allowed by the specified fabrication tolerances.

A maximum total feeding length of approximately six times the flight diameter has been previously achieved by a screw having a first portion extending three flight diameters with constant pitch and changing shaft diameter, and a second portion with increasing pitch and constant shaft diameter extending an additional three flight diameters.

In the prior art designs the significant design limitation with respect to the length of the screw is the relationship between the change in volume capacity per unit of length at any point on the screw and the tolerance within which the pitch can be fabricated at such point. For example, with a twelve-inch diameter screw, good workmanship may permit fabrication within a pitch tolerance of 0.375 inch deviation from the specified value. This pitch tolerance translates to a volume deviation of 0.036 cubic feet per foot of length. With a screw of uniform pitch and with a pitch tolerance of 0.375 inch, if the shaft diameter is tapered from 11½ to 4 inches and the shaft length is only 2.75 flight diameters, the change in volume capacity per unit of length at the small end of the taper will be 0.036 cubic foot per foot. Any increase in the length would result in a volume change even less than that resulting from the stated tolerance of fabrication.

With the foregoing observations in view, the objects of this invention are to provide improvements in screw feeders that permit uniform feed from hoppers and relax the limitations on the length of the hopper outlet imposed by fabrication tolerances of the feeder.

A related object is to provide feeding screws to accommodate hopper outlets of greater axial length than those hitherto employed.

Another object is to provide simpler techniques of screw fabrication, involving less skill and cost.

A further object is to provide methods of screw fabrication that facilitate the acquisition of feed screws from custom suppliers, thereby reducing costs attributable to the making of special screw feeders by experts.

With the foregoing and other objects hereinafter appearing in view, the features of this invention include the provision of a plurality of coaxial and contiguous cylindrical sections comprising a shaft, together with a screw blade having its flights radially extending from the surfaces of the sections, whereby the volume capacity of the sections increases along the length of the screw.

By suitable control of the diameters of the respective sections, it is possible to cause the change of their volume capacity from section to adjacent section to be constant over the length of the screw. Since this rate may be set substantially above the tolerance of fabrication, it is possible to provide a screw of a length substantially exceeding the number of flight diameters to which prior screw feeders were limited.

Other features of the invention include improvements in the ease of fabrication of screw feeders that result from the stepped configuration. These and other features will become apparent from the following description.

DETAILED DESCRIPTION

Figure 1:
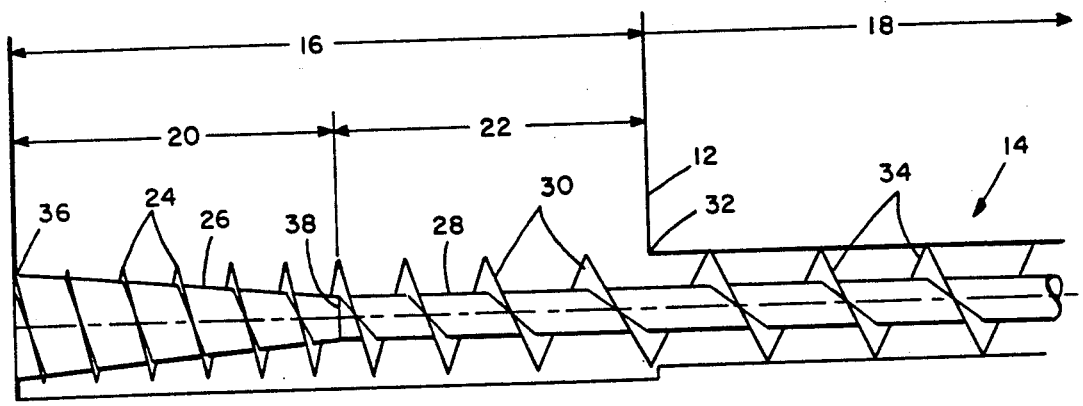
FIG. 1 is an illustration of a hopper fitted with a prior art feeder screw, shown for purposes of comparison.

FIG. 1 schematically illustrates a hopper 12 having a conventional feeder screw 14. This screw comprises a feeding portion 16 within the hopper and a conveying portion 18, the portion 16 being divided into portions 20 and 22.

The portion 20 has screw flights 24 of constant pitch extending from the surface of a frustoconical shaft member 26. The portion 22 comprises a shaft member 28 of constant diameter equal to that of the member 26 at the small end of the taper. Flights 30 in this section have increasing pitch in the feed direction The shaft 28 extends through an aperture 32 in the hopper and forms the shaft of the conveying portion 18 of the screw. Flights 34 in the conveying portion are of constant pitch. The pitch diameters throughout the length of the screw are equal.

As noted above, since the shaft member 26 is frustoconical in shape, the rate of change of the volumetric capacity of the screw per increment of shaft length varies from a maximum at the back end 36 of the screw to a minimum at the small end 38 of the shaft member 26. This results from the fact that while the diameter of the portion 20 varies linearly along its length, the change in volume per increment of length is a linear function of diameter and is largest where the shaft diameter is largest. Therefore, uniform feed from the hopper along the length of the screw is not achieved. Also, the length of the portion 16 within the hopper as a function of the flight diameter is limited. This limitation is imposed by the maximum deviation in the pitch of the flights which is allowed by the specified fabrication tolerances. Thus, the length of the portion 20 should not be sufficient to reduce the diameter of the shaft member 26 below the value that would produce a rate of volumetric change per unit of shaft length below the corresponding rate that would result from the maximum allowed deviation in pitch.

Figure 2:
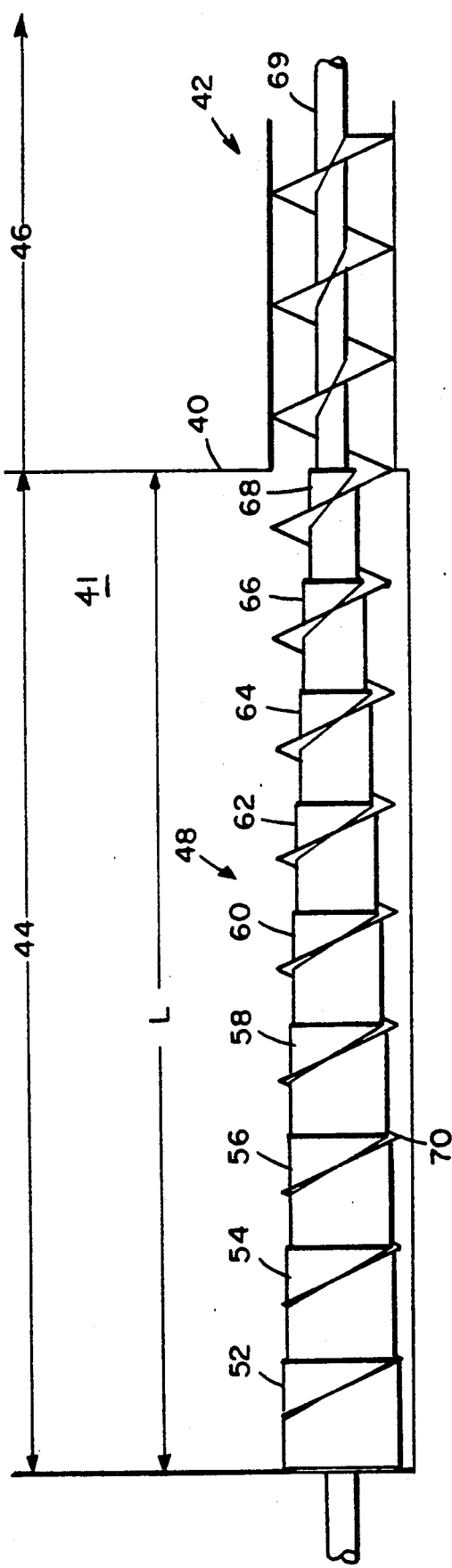
FIG. 2 is an illustration of a hopper fitted with a first embodiment of the invention comprising screw flights of constant pitch.

FIG. 2 illustrates a first embodiment of the invention. A hopper 40 for particulate material 41 is fitted with a feed screw 42 comprising a feeding portion 44 within the hopper and a conveying portion 46. The feeding portion comprises a shaft designated generally at 48 comprising a plurality of coaxial and contiguous cylindrical sections 52, 54, 56, 58, 60, 62, 64, 66 and 68. These sections are of equal length and form a stepped configuration with their diameters decreasing along the length L of the portion 44. The section 68 is adjacent a shaft section 69 of uniform diameter extending in the conveying portion 46.

Superimposed over the sections 52 to 69 is a screw blade 70 with flights of constant pitch and constant pitch diameter and extending throughout the portions 44 and 46 of the screw. The screw blade is formed in a helix coaxial with the shaft 48 and having surfaces radially extending from the surface of each section to its outer edge.

According to the invention, the diameters of the cylindrical sections 52 to 68 are related in the following manner. The volume capacity of each section is the volume of the annulus defined by the surface of the section and a cylinder whose diameter equals that of the flights of the blade 70. The volume capacity of a length of the screw within the conveying section 46, which length is equal to the axial length of one of the sections 52 to 68, is thus determined. This volume is divided by the number of sections 52 to 68. The quotient equals the desired increment in volumetric capacity from each section to the next adjacent section. The diameter of the section 52 is that which creates a volume capacity equal to one increment; the diameter of the section 54 is that which creates a volume capacity equal to two increments; and so on for all of the sections.

In this manner, each screw rotation advancing the material by the length of one section results in one increment feeding into the screw from the hopper above each section.

The length L is limited by the deviation in pitch that may result from the fabrication of the flights of the blade 70, but when the rate of volumetric change per unit of shaft length approaches that resulting from the maximum allowed deviation in pitch, the length of the feeding section 44 is approximately 12 flight diameters. Therefore the length of the hopper outlet may be made very large relative to the flight diameter.

In the embodiment of FIG. 2 the pitch of the flights equals the length of each cylindrical section of the shaft. This is desirable for purposes of fabrication because the screw may be formed of separate sections each having attached to it a portion of the blade 70. These sections may be joined together after assembly on a shaft with adjacent blade portions being welded together or otherwise joined to form a continuous helix. None of the blade portions requires cutting to fit over the shoulders between adjacent sections. For similar reasons a multiple of the pitch may equal the axial length of each section.

It will also be evident that the fabrication of the sections with their screw flight portions as separate parts makes it possible to create inventories from which feeding screws may be formed by the selection of sections from inventories of parts.

Feeding screws may be purchased from custom flight vendors, and the final welding or joining after assembly of these sections does not require skilled cutting and fitting as required for the fabrication of the conical shaft of FIG. 1.

Figure 3:
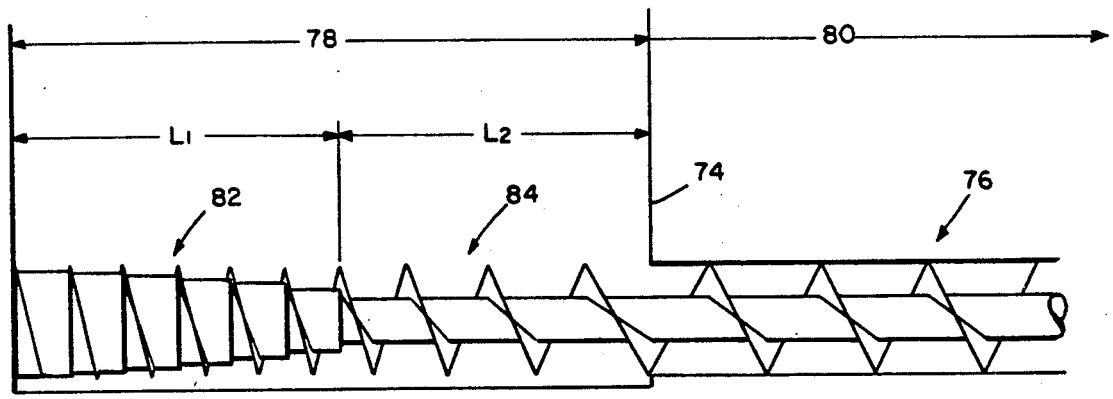
FIG. 3 illustrates a hopper fitted with a second embodiment of the invention with a length L1 of constant pitch and a length L2 of increasing pitch.

FIG. 3 shows a second embodiment of the invention. A hopper 74 is fitted with a feeding screw 76 comprising a feeding portion 78 and a conveying portion 80. The feeding portion is divided into a length $L_1$ comprising a feeding screw 82 constructed according to the embodiment of FIG. 2, and a length $L_2$ comprising a feeding screw 84 of increasing pitch constructed in the same manner as the portion 22 of the feeding screw 14 in FIG. 1. Thus a feeding screw according to the present invention may be coextensive with the hopper outlet as in FIG. 2, or it may comprise only a portion of the hopper outlet.

We claim:

1. A feed screw for use in a rectangular bin outlet comprising the combination of
   a shaft comprising a plurality of coaxial and contiguous cylindrical sections having progressively decreasing diameters and extending along a length L in the feed direction and
   a screw blade formed in a helix coaxial with the shaft and having surfaces radially extending from the surface of each section of the shaft to an edge of constant diameter D over the length L, the volume capacity of each section being proportional to the difference between $D^2$ and the square of the cylindrical section diameter, and the differences in volume capacity between each pair of contiguous sections being equal over the length L.

2. A feed screw according to claim 1, in which the axial lengths of the sections are equal.

3. A feed screw according to claim 1, in which the pitch of the helix within each section equals an integer times the axial length of said section.

4. A feed screw according to claim 2, in which the pitch of the helix equals an integer times the axial length of a section.

5. A feed screw according to claim 1, in which the screw comprises a separate screw blade portion attached to the surface of each cylindrical section, said sections being assembled with their screw blade portions attached to form said helix.

6. A feed screw for use in a rectangular bin outlet comprising the combination of
   a shaft comprising a plurality of coaxial and contiguous cylindrical sections having progressively decreasing diameters and extending along a length L1 and an end cylindrical section of constant diameter extending along a length L2 adjacent the length L1 in the feed direction, and
   a screw blade formed in a helix coaxial with the shaft and having surfaces radially extending from the surface of each section of the shaft to an edge of constant diameter D over the lengths L1 and L2, the volume capacity of each section being proportional to the difference between D2 and the square of its diameter, the difference in volume capacity between each pair of contiguous stepped sections being equal over the length L1, and the pitch of the screw being constant over the length L1 and progressively increasing over the length L2.

* * * * *

UNITED STATES PATENT AND TRADEMARK OFFICE
CERTIFICATE OF CORRECTION

PATENT NO.   :   5,101,961
DATED        :   April 7, 1992
INVENTOR(S)  :   K. Eric Bengtson and E. LeRoy Baldwin It is certified that error appears in the above-identified patent and that said Letters Patent is hereby corrected as shown below:

Column 6, claims 3 and 4, transpose "an integer times" to follow "which" in line 1.

Column 6, line 31, cancel "D2" and substitute $--D^2--$.

Signed and Sealed this

Twenty-second Day of March, 1994

Attest:

BRUCE LEHMAN

Attesting Officer        Commissioner of Patents and Trademarks